United States Patent [19]

Kremer

[11] 4,173,265

[45] Nov. 6, 1979

[54] DEVICE FOR MEASURING THE TORQUE IN A SHAFT

[75] Inventor: Manfred Kremer, Hamburg, Fed. Rep. of Germany

[73] Assignee: Still GmbH, Hamburg, Fed. Rep. of Germany

[21] Appl. No.: 863,400

[22] Filed: Dec. 22, 1977

[30] Foreign Application Priority Data

Dec. 23, 1976 [DE] Fed. Rep. of Germany ....... 2658697

[51] Int. Cl.² ............................................. B62D 5/04
[52] U.S. Cl. ................................ 180/79.1; 73/136 A; 338/32 R
[58] Field of Search ................ 180/79.1, 79, 141, 142, 180/78; 338/32 R; 73/DIG. 3, 136 A

[56] References Cited

U.S. PATENT DOCUMENTS

| 2,534,536 | 12/1950 | Staude ................................. 180/79.1 |
| 2,775,132 | 12/1956 | Orr ...................................... 180/79.1 |
| 4,020,918 | 5/1977 | Houskamp .......................... 180/79.1 |

Primary Examiner—Joseph F. Peters, Jr.
Assistant Examiner—R. Schrecengost
Attorney, Agent, or Firm—Karl F. Ross

[57] ABSTRACT

A device for measuring torque in a shaft, e.g. for controlling a power-assist steering arrangement for a vehicle, in which two rotatable parts of a shaft are coupled together by an elastic body while one of the shaft parts comprises a magnet and the other has a differential field plate sensor responsive to the position of the magnet relative to the sensor for generating an analog output representing the torque exerted between the parts of the shaft and hence the torque applied to the latter in rotating the shaft. The magnet lies opposite the center of the differential field plate sensor in an unloaded condition of the shaft.

12 Claims, 5 Drawing Figures

DEVICE FOR MEASURING THE TORQUE IN A SHAFT

FIELD OF THE INVENTION

The present invention relates to a device for measuring the torque in a shaft and, more particularly, to a torque-responsive device for controlling the power steering of a vehicle.

BACKGROUND OF THE INVENTION

In an automotive vehicle it is common practice to provide power-assist means for facilitating the steering of the vehicle. To this end, a servomotor or other powered unit is coupled to the steering linkage or the steerable wheels of the vehicle and is operated in response to rotation of the steering-wheel shaft.

It is known to provide the shaft of the steering wheel of a vehicle with a device generating an output for operating the servomotor or power-assist steering unit of the vehicle.

For example, the steering-wheel shaft can be provided with means responsive to a relative rotation of one part of the shaft relative to the other, e.g. the hub carrying the steering wheel relative to the shaft connecting the latter to the steering linkage, in the form of a spring which is compressed depending upon the degree of relative rotation and hence the displacement of the steering wheel to one side or another. In this arrangement, two springs are provided which are compressed alternatively depending upon the sense of rotation of the steering wheel. Upon compression of either of these springs, a respective contact is closed to generate an electric signal and operate a motor for controlling the power-steering system. This arrangement, however, has the disadvantage that it only is capable of providing an ON-OFF signal representing the side to which the steering wheel is rotated and hence the direction to which the steerable wheels of the vehicle are to be turned. A system of this type can be found, for example, in German Pat. No. 613,383.

In another known system for operating the power-steering mechanism of a vehicle, the steering wheel is connected via the steering shaft by four tangentially oriented carbon-compression resistors and these resistors are connected in a bridge circuit. The force between the steering wheel and the steerable wheels is thus transmitted to the steering shaft via these carbon-compression resistors and the resistors generate a continuous signal which varies as a function of the degree of compression. In this arrangement, an additional elastic connection between the relatively rotatable parts of the system connecting the steering wheel to the steering mechanism is not provided and the resistors must take up the full steering force to their detriment.

It is also known to provide means for signaling the torque in a shaft by providing the surface of the shaft with helical or spirally arranged strain-gauge members which can also be connected in a bridge circuit. The resistor system is described in French Pat. No. 1,185,576.

All of the systems discussed above suffer from excessive complexity, unreliability and failure after only a brief useful life.

OBJECTS OF THE INVENTION

It is the principal object of the present invention to provide and easily maintained, reliable, inexpensive and readily assembled torque measuring system or device which avoids the disadvantages enumerated above.

Yet another object of the invention is to provide a torque measuring system which is particularly advantageous for use with the power steering of an automotive vehicle.

Still another object of this invention is to provide an improved power-steering system having inexpensive and reliable means for measuring a torque at the steering wheel of the vehicle.

SUMMARY OF THE INVENTION

These objects and others which will become apparent hereinafter are attained, in accordance with the present invention, in a device for measuring the torque in a shaft wherein the shaft is subdivided into two relatively rotatable parts, one of which can be connected to the steering wheel while the other is connected to the steerable wheels, e.g. directly through the usual steering linkage, or to a torque-producing electric motor for power-assist steering. According to the present invention, the two shaft parts are elastically connected together so that the force transmission between them is transmitted by an elastic body but the two parts are nevertheless relatively rotatable, the angular offset of the two parts from their rest positions, i.e. the relative displacement of one of the parts with respect to the other, being a function of the torque applied to the driving part, i.e. the part connected to the steering wheel.

According to an important feature of the present invention, means is provided between the two parts to generate an electric signal representing the torque as a function of the relative angular displacement of the two parts.

The signal generator or transmitter preferably constitutes a permanent magnet connected to one of the parts and a differential field plate sensor connected to the other part. The differential field plate sensor has an output which represents the displacement of the sensor relative to the magnet. The magnet, in an unloaded or undisplaced position of the shaft, is disposed opposite the center of the differential field plate sensor.

As is known, a differential field plate sensor (also known as a magnetoresistive differential sensor or transducer) generates an analog output signal which is a function of the offset of a magnet from one position of the differential field plate toward another position thereof (see chap. 3, pp 21ff of *Handbook of Telemetry and Remote Control*, McGraw-Hill, NY 1967). In the system of the present invention, this output signal is of a polarity and magnitude representing the side to which the steering wheel is rotated and hence the degree to which the part of the shaft connected to the steering wheel is angularly offset relative to the retarded part of the shaft which is connected to the steering linkage and hence the degree to which the elastic body is deformed by the torque applied to the steering wheel.

According to another feature of the invention, the relative angular displacements of the two shaft parts is limited by providing, in addition to the elastic body therebetween, a lost-motion linkage which directly couples the two shaft parts upon exceeding of the angular lost motion therebetween.

According to still another feature of the invention, the differential field plate sensor is connected to a circuit for controlling the power steering and disposed on a stationary part of the vehicle by a conductor tape or strip provided with the conductors electrically connecting the differential field plate sensor to the control circuitry.

A steering-wheel assembly fabricated in accordance with the principles of the present invention, the conductor strip is coiled about the axis of the steering-wheel shaft and is fully unwound in the position of the steering wheel corresponding to straight travel of the vehicle. When the steering wheel is rotated fully in either of the opposite senses representing complete deflection of the wheels to either side of the vehicle, the tape or band carrying the conductors can be completely coiled around the steering post or within the steering post around the steering shaft.

Alternatively, for straight travel of the vehicle, the conductor tape can be half unwound and upon maximum rotation of the steering wheel in either sense can be either fully unwound or fully wound about the steering-wheel shaft.

According to yet another feature of the invention, the elastic body coupling the two shaft parts is composed of an elastic material such as rubber or from an elastic synthetic resin. The body may be in the form of a sleeve vulcanized to inner and outer metal shells which are coupled to the shaft parts which can coaxially fit one into the other. In this case, the sleeve can be coaxial with the two shaft parts. One of the shaft parts can thus be formed as a cylindrical shell engaging the outer shell of the elastic body while the other shaft part can extend into the shell and can engage an inner metal sleeve portion of the elastic body. The elastic material can be vulcanized or otherwise bonded to the inner and/or outer metallic sleeve of this body.

The angular play permitted by the elastic sleeve can be limited by an abutment pin fitted into one of the shafts parts and received with play in a slot or recess in the other shaft part.

The small magnet and differential field plate sensor required as the signal transmitter of the present invention have been found to be extremely expensive and readily mounted or assembled parts which are highly reliable requiring practically no maintenance. They have extremely long operational lives and are free from the disadvantages of the earlier systems described above. Upon deformation of the elastic body under the effect of the torque applied to the shaft, the magnet is displaced relative to the differnetial field plate sensor which generates an analog signal representing the torque mentioned previously.

The signal of the differential field plate sensor can be drawn therefrom by conventional elements such as sliprings mounted on the shaft and connected to the control or measuring circuitry which may be disposed on a relatively fixed portion of the vehicle body.

Sliprings, however, have the disadvantage that they may become contaminated or can suffer corrosion which may increase the contact resistance between the slipring and the brush in contact therewith. This may falsify the signal and render the power-steering system inacurate, nonresponsive or ineffective.

Thus, I prefer to provide the aforementioned means for deriving the signal from the differential plate sensor, namely a flat conductor, conductor strip or conductor band. The conductor band is highly flexible and does not undergo distortion if it is provided in a loose loop with a multiplicity of turns around the steering post or the steering shaft. The band may be provided at its fixed end with the usual jack or plug for connection to the control circuitry. The two alternatives described above in which the band is fully wound around the post in an extreme position of the steering wheel or is fully unwound in the opposite extreme position or, alternatively, in which the band is practically wound about the shaft in the imtermediate position of the steering wheel and is either fully wound or fully unwound in the extreme positions are preferred modes of mounting the conductor tape or band.

It has already been noted that a lost-motion linkage is provided between the two shafts parts in addition to the elastic body so that a direct mechanical coupling without slippage can occur after a relative displacement of the two shaft parts corresponding to a maximum angular displacement of the magent and the differential field plate sensor. This prevents overloading of the elastic body and nevertheless permits the power steering to remain effective to assist in the displacement of the steerable wheels which in any event are displaced by the mechanically coupled parts of the steering-wheel shaft.

The elastic body may consist of the elastic material marketed under the name VULKOLLAN.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
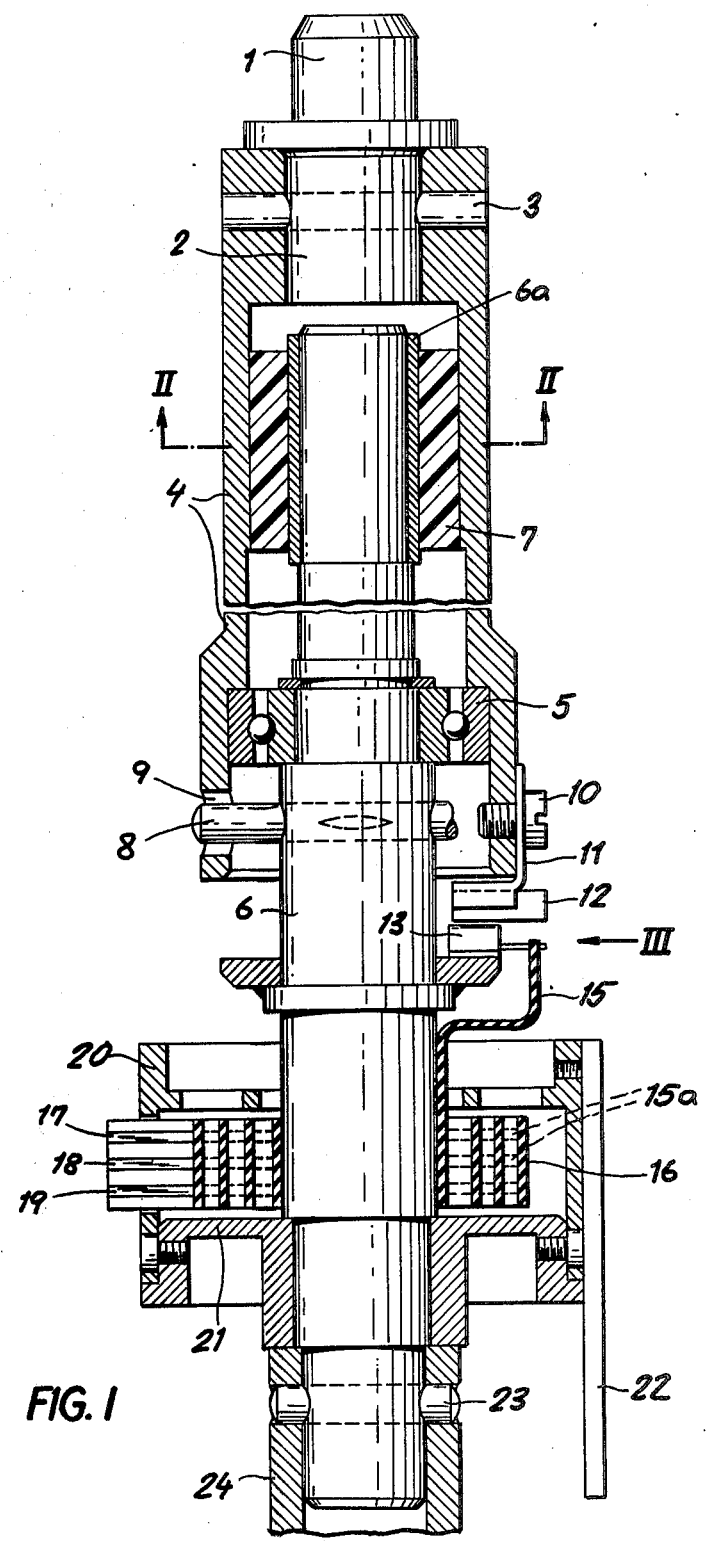
FIG. 1 is an axial cross-sectional view diagrammatically illustrating a portion of a steering-wheel shaft embodying the present invention.

In the drawing I have shown a steering-wheel shaft whose hub 1 is connected to the steering wheel (not shown) and is formed in one piece with a stud 2 to constitute one shaft part in accordance with the present invention. This shaft part also includes a sleeve 4 which is connected to the stud 2 by a transverse pin 3. The transverse pin 3 extends through radially aligned bores in the stud 2 and the sleeve 4.

The sleeve 4 is downwardly open and is journaled upon a roller bearing 5 on the other steering-wheel shaft part 6 which is connected by means not shown in FIG. 1. to the steering linkage. Thus a portion of the shaft part 6 is received within the sleeve 4.

A sleeve 7 composed of an elastic material, for example, a polyurethane marketed under the name VULKOLLAN, is connected on the one hand to the sleeve 4 and on the other hand with the shaft part 6 within this sleeve and thus constitutes an elastic connection between the sleeve 4 and the shaft part 6. In a nonactuated position of the shaft, the sleeve 4 has relative to the shaft part 6 a predetermined rest position in which the sleeve 7 is stress free. To either side of this rest position, however, the sleeve 4 can be rotated to distort the sleeve 7 and angularly entrain the shaft part 6. The degree of angular offset between the sleeve 4 and the shaft part 6 is thus a measure of the torque applied to the steering wheel engaging the hub 1.

The shaft part 6 is provided with a force-fitted transverse pin 8 which reaches into a recess 9 in the sleeve 4. The recess 9 is circumferentially larger than the diameter of the pin 8 to provide a play or lost motion. Within this lost motion, the sleeve 4 can be rotated relative to the shaft 6 against the resilient force of body 7. Beyond this lost motion, the inner wall of recess 9, at either end thereof, engages the pin 8 and a direct force-transmitting relationship is provided between the sleeve 4 and the shaft part 6 via the pin 8.

A bracket 11 is affixed by means of a screw 10 to the sleeve 4 and carries a permanent magnet 12. The permanent magnet 12 is disposed opposite a differential field plate sensor 13 which, in turn, is fixed to a support plate 14 lying in a plane perpendicular to the axis of shaft part 6 and welded to a shoulder thereof. In the stress-free position of the sleeve 7, the permanent magnet 12 lies precisely opposite the center of the differential field plate 13. Upon relative rotation between the sleeve 4 and the shaft part 6, resulting in stressing of the sleeve 7 in either direction and hence a consequence of the application of torque to the steering wheel, the permanent magnet 12 rotates from the position opposite the center of the differential field plate sensor 13. As a consequence, the magnetic characteristics of the differential field plate sensor vary and the resulting electrical signals are delivered by three conductors connected respectively to the three terminals of the differential field plate sensor 13.

The three terminals of differential field plate sensor 13 are connected to the conductors 15a of a conductor strip or ribbon cable 15 with three terminals 17, 18 and 19 forming a jack to which the control circuit (not shown in FIG. 1) is connected. This control circuit (not shown in FIG. 1) is connected. This control circuit regulates the power-steering system of the vehicle.

The ribbon conductor 15 is formed with a coil 16 loosely around the shaft part 6 in the intermediate position of the latter. When the shaft 6 is rotated in either sense corresponding to extreme steering positions to the left and the right, the ribbon conductor 15 is either fully unwound about the shaft part 6 as previously described.

Housing 20 is provided around the ribbon conductor 16 and is fixed via a frame portion 22 to the vehicle body. The bottom 21 of this housing is provided with an opening through which the shaft part 6 passes. The shaft part 6 is connected by a further transverse pin 23 to the steering-column tube 24 connected, in turn, to the steering linkage.

Figure 5:
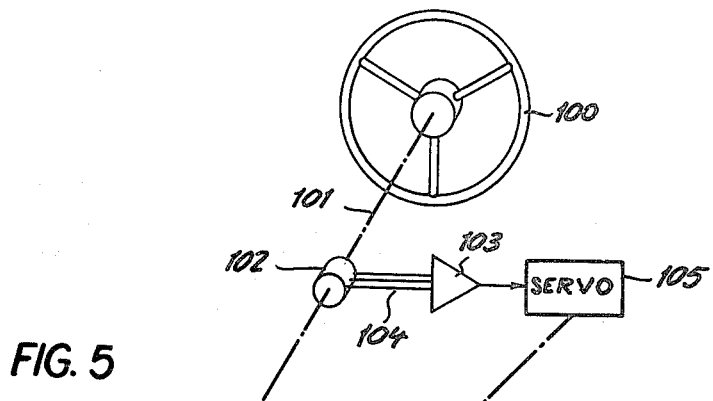
FIG. 5 is a diagram illustrating the application of the invention to the control of the power steering of a motor vehicle.

Referring now to FIG. 5, it may be seen that the steering wheel 100 is connected to the shaft consisting of the shaft parts 1, 2, 4 and 6, collectively identified as the steering-wheel shaft 101 in this Figure.

The signal generator constituted by the magnet 12 and the differential field plate sensor 13 is represented at 102 and generates a signal applied through the conductor 104, representing the ribbon-conductor system 15 through 19, to an amplifier 103 which operates the servomotor 105 in the sense corresponding to the steering wheel 100 to the degree determined by the torque applied to the shaft 101. The servomotor 105 is connected to the steering linkage 106 for the steerable wheels 107 and 108 of the vehicle. The shaft 101 is, in addition, connected through a worm gear or like mechanical steering linkage 109 with the mechanism 106 so as to operate the steering mechanism when the pin 8 engages an end of this slot 9.

Figure 2:
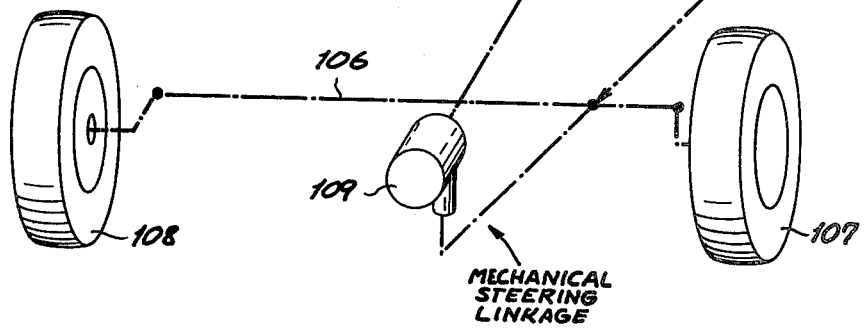
FIG. 2 is a cross-sectional view taken along the line II—II of FIG. 1.
Figure 2:
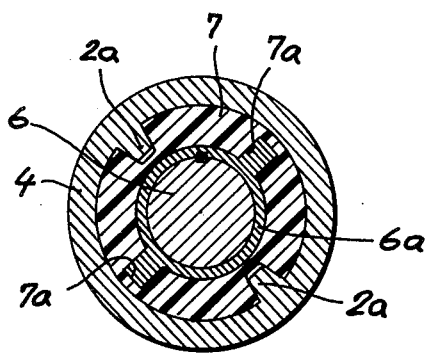
Figure 3:
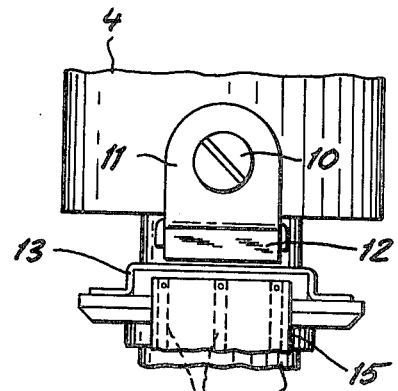
FIG. 3 is a diagrammatic view of a portion of the steering-wheel shaft in the region III of FIG. 1.
Figure 4:
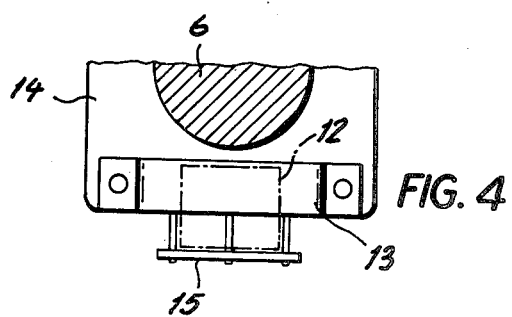
FIG. 4 is a plan view showing the differential field plate sensor of FIG. 3 from above.

From FIGS. 2 through 4 it will be apparent that the elastic body 7 can be internally splined, as shown at 7a, and engage an externally splined sleeve 6a on the shaft part 6. The sleeve 6a is vulcanized to the elastic body 7 which, in turn, is vulcanized to external metal sleeve 4 and engages inwardly directed splines 2a formed thereon. Conductors 15a reach into leads 15c which are connected to the center and ends of the differential field plate 13 as shown in FIG. 4. The disposition of the magnet 12 opposite the center of the differential field plate 13 has been shown in FIG. 3.

I claim:

1. A device for measuring the torque in a shaft, comprising a pair of relatively rotatable shaft parts disposed along a common axis, an elastic body resiliently interconnecting said shaft parts and a signal generator connected to said shaft parts for generating an electric signal representing the torque applied to one of said shaft parts as a function of relative angular displacement of said shaft parts against a restoring force supplied by said body, said signal generator comprising a permanent magnet connected to said one of said shaft parts and a differential field plate sensor mounted on the other of said shaft parts, said magnet being disposed opposite the center of said differential field plate sensor in a no-load condition of said shaft corresponding to a nonstressed condition of said body.

2. The device defined in claim 1, further comprising a conductor ribbon connected to said differential field plate sensor and connectable to a circuit responsive to the output thereof, said ribbon being wound at least partially around one of said shafts.

3. A device for measuring the torque in a shaft, comprising:
   a pair of relatively rotatable shaft parts disposed along a common axis;
   an elastic body resiliently interconnecting said shaft parts;
   a signal generator connected to said shaft parts of generating an electric signal representing the torque applied to one of said shaft parts as a function of relative angular displacement of said shaft parts against a restoring force supplied by said body, said signal generator comprising a permanent magnet connected to said one of said shaft parts and a differential field plate sensor mounted on the other of said shaft parts, said magnet being disposed opposite the center of said differential field plate sensor in a no-load condition of said shaft corresponding to a non-stressed condition of said body; and
   a conductor ribbon connected to said differential field plate sensor and connectable to a circuit responsive to the output thereof, said ribbon being wound at least partially around one of said shafts, said shaft parts being disposed coaxially with one another and said body is a sleeve coaxial with said shaft parts and internally connected to one of said shaft parts and externally connected to another of said shaft parts.

4. The device defined in claim 3, further comprising a lost-motion linkage interconnecting said shaft parts for rigidly coupling same for joint rotation upon predetermined relative angular displacement of said shaft parts against the restoring force of said body.

5. A power-assist steering system for an automotive vehicle comprising a steering shaft having a pair of coaxial shaft parts, one of said shaft parts being connected to a steering wheel, the other of said shaft parts being connected to steerable wheels of said vehicle; an elastic body interconnecting said shaft parts; a signal generator connected to said shaft parts for generating an electric signal corresponding to the torque applied to said steering wheel, said signal generator including a permanent magnet fixed to a first of said shaft parts and a differential field plate sensor connected with a second of said shaft parts and juxtaposed with said permanent magnet, said permanent magnet being located opposite the center of said differential field plate sensor in a position of said steering wheel corresponding to straight-line travel of said vehicle, said steering wheel being rotatable in opposite senses about said axis; circuit means connected to said signal generator for power-assist operation of the steerable wheels; and means connected to said circuit means for displacing said steerable wheels in response thereto.

6. A power-assist steering system for an automotive vehicle comprising:
a steering shaft having a pair of coaxial shaft parts, one of said shaft parts being connected to a steering wheel, the other of said shaft parts being connected to steerable wheels of said vehicle;
an elastic body interconnecting said shaft parts;
a signal generator connected to said shaft parts for generating an electric signal corresponding to the torque applied to said steering wheel, said signal generator including a permanent magnet fixed to a first of said shaft parts and a differential field plate sensor connected with a second of said shaft parts and juxtaposed with said permanent magnet, said permanent magnet being located opposite the center of said differential plate sensor in a position of said steering wheel corresponding to straight-line travel of said vehicle, said steering wheel being rotatable in opposite senses about said axis;
circuit means connected to said signal generator for power-assist operation of the steerable wheels; and
means connected to said circuit means for displacing said steerable wheels in response thereto, said first of said shaft parts being formed with a sleeve and said second shaft part extending coaxially into said sleeve, said body being tubular and being connected externally to said sleeve and internally to said second shaft part.

7. The system defined in claim 6 wherein said magnet is connected to said sleeve and said differential field part sensor is connected to said second shaft part.

8. The system defined in claim 6, further comprising a ribbon conductor connected between said differential field plate sensor and said circuit means.

9. The system defined in claim 8 wherein said ribbon conductor is at least partially coiled around said shaft.

10. The system defined in claim 9 wherein said ribbon conductor is completely uncoiled in a position of said steering wheel corresponding to straight-line travel of the vehicle but is fully wound about said shaft upon rotation of said steering wheel in either sense to an extreme steering position thereof.

11. The system defined in claim 9 wherein said ribbon conductor is partly coiled around said shaft in a position of said steering wheel corresponding to straight-line travel of the vehicle and is fully unwound upon rotation of said steering wheel in one sense to one extreme position and is fully wound about said shaft upon rotation of said steering wheel to an extreme position in the opposite sense.

12. The system defined in claim 7, further comprising a lost-motion linkage disposed between said shaft parts for rigidly interconnecting same for joint rotation upon displacement of said steering wheel in either sense beyond extreme relative angular displacements of said shaft parts stressing said body.

* * * * *